United States Patent [19]

Doshi

[11] Patent Number: 4,704,902

[45] Date of Patent: Nov. 10, 1987

[54] ACOUSTICAL VOLUME/PRESSURE MEASUREMENT DEVICE

[76] Inventor: Navin H. Doshi, 6418 Springpark Ave., Los Angeles, Calif. 90056

[21] Appl. No.: 883,911

[22] Filed: Jul. 10, 1986

Related U.S. Application Data

[63] Continuation-in-part of Ser. No. 677,880, Dec. 4, 1984, Pat. No. 4,599,892.

[51] Int. Cl.⁴ ............................................. G01F 17/00
[52] U.S. Cl. ..................................... 73/149; 73/290 V
[58] Field of Search ...................... 73/49.2, 149, 290 V

[56] References Cited

U.S. PATENT DOCUMENTS

| | | | |
|---|---|---|---|
| 3,237,451 | 3/1966 | Haeff | 73/149 |
| 3,596,510 | 8/1971 | Paine | 73/149 |
| 4,383,443 | 5/1983 | Langdon | 73/290 V |

*Primary Examiner*—Jerry W. Myracle
*Attorney, Agent, or Firm*—Robert J. Schaap

[57] ABSTRACT

The apparatus consists of a mechanical acoustical driver producing sound vibrations in a fluid, such as a liquid or gas, within an enclosed space. A pickup transducer positioned within the tank measures the sound vibrations of the gas within the tank and transmits the same to an amplifier and a low pass filter. Either the same or another transducer positioned in the tank measures static pressure P output of which is amplified. A divider circuit receives the dynamic pressure signal and static pressure signal and provides electrical signal E proportional to ($\Delta P/P$). A differential amplifier receives the reference signal Erf and the signal E and supplies the error signal (Erf-E) to a gain controlled amplifier. The gain controlled amplifier amplifies the AC signal proportional to (Erf-E). The driver generates $\Delta P$ in the tank proportional to the output of the gain controlled amplifier.

12 Claims, 4 Drawing Figures

ACOUSTICAL VOLUME/PRESSURE MEASUREMENT DEVICE

This application is a continuation-in-part of Ser. No. 677,880, now U.S. Pat. No. 4,599,892 to Doshi filed Dec. 4, 1984, now copending.

BACKGROUND OF THE INVENTION

1. Field of the Invention

The invention relates generally to an apparatus for measuring the volume of an incompressible material confined within a space or the pressure of a compressible material confined within a space, and more particularly to an apparatus using an accoustical method for making such measurements.

2. Description of the Prior Art

Various methods for measuring the amount of liquid in a storage space are currently being used. In addition, various methods for measuring the the pressures of a compressible fluid in a storage space are also being used. Prior art methods have many disadvantages and are often inordinately complex. Prior art methods typically also introduce inaccuracies in the volume and pressure measurements.

Prior art methods are discussed in more detail in U.S. Pat. No. 4,599,892 filed Dec. 4, 1984 which is hereby incorporated herein by reference.

SUMMARY OF THE INVENTION

The present invention provides a simple apparatus for acoustically measuring a volume of a liquid or solid within an enclosed chamber.

The present invention also provides a simple apparatus for acoustically measuring static pressure changes of a compressible fluid.

The present invention also provides a simple apparatus for acoustically measuring the ratio of the specific heats of a compressible fluid.

The present invention further provides a simple apparatus which can make acoustical measurements without requiring a reference volume of a compressible fluid.

The present invention additionally provides a simple apparatus for making acoustical measurements of volume/pressure to a high degree of accuracy.

The present invention also provides an acoustical volume/pressure measuring apparatus which has a linear output from zero volume/pressure to a desired maximum.

The present invention also provides an acoustical measuring apparatus which can detect leakage of a gas, liquid or solid from an enclosed space.

The present invention utilizes an acoustical driver and detector in conjunction with an electrical servo system. The present invention is essentially a closed loop master/slave electromechanical system for accurately measuring volume of a compressible fluid or pressure of a compressible fluid or specific heat ratio of a compressible fluid.

The acoustical driver may be either a mechanical or electrodynamic device. The acoustical detector is an electrical, electro-optical, electrodynamic or piezo electric transducer. An electrical amplification circuit is incorporated to amplify the signal from the detector and to amplify the difference between the detector output signal and a reference signal.

The primary purpose of the circuit is to keep the ratio of the change of pressure of the fluid to be measured in relation to the static pressure constant. The ratio is maintained constant by making it equivalent to a selected reference signal. Thus, since the differential pressure ($\Delta P$) divided by the static pressure is proportional to the differential volume ($\Delta V$) divided by the static volume (V), ($\Delta V$) is proportional to (V). Consequently, making an accurate measurement of ($\Delta V$) can provide a value for (V). The servomechanical system utilizing an electrical amplication circuit having a very high "loop gain" (greater than 100,000) provides an extremely accurate and precise measurement of the desired quantities i.e., ullage volume directly, volume of incompressible material in an enclosed space indirectly or compressibility of gas or compliance of the enclosure (human lung compliance) or gas pressure, density or specific heat ratio.

By enabling the accurate and precise measurement of the differential pressure or volume of a gas, the present invention provides a system which is able to acoustically detect leakage of a gas, liquid, or solid from an enclosed space. Thus, the present invention provides a simple device for measurement of the volume of a solid or liquid in an enclosed space or for measurement of the differential volume of such a solid or liquid. Moreover, since the relationship of the quantities measured to the quantities to be determined is linear the system of the present invention provides measurements which are very accurate within a broad range of values.

The components of the present invention include an electrical amplifier for the differential pressure detector, an electrical amplifier for the static pressure detector, a variable reference voltage source for maintaining $\Delta P/P$ equal to a selected constant and a servomechanical system with a suitable gain controlled amplifier for driving an acoustical driver. There is no need for a reference chamber. Thus, the system is relatively simple which improves its accuracy and reliability in comparison with prior art sytems. Moreover, the use of high gain electrical components enhances the precision of the system.

BRIEF DESCRIPTION OF THE DRAWINGS

A better understanding of the present invention may be had from a consideration of the following detailed description taken in conjunction with the accompanying drawings in which.

DETAILED DESCRIPTION OF THE PREFERRED EMBODIMENT

Figure 1:
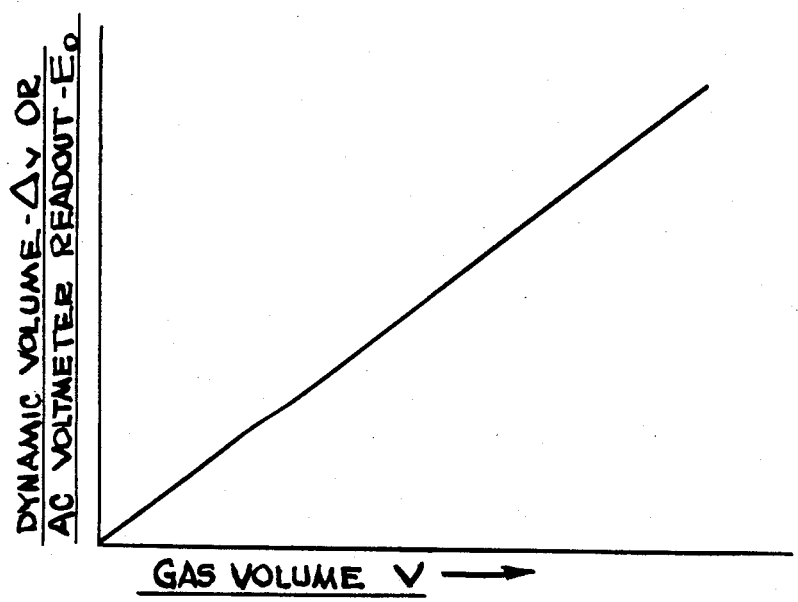
FIG. 1 is a graphical illustration of the response of the system of the present invention where $\Delta P/P$ is constant.

Referring to the drawings, there is shown a preferred embodiment of the system of the present invention generally designated by the numeral 10. The apparatus 10 includes both electrodynamic (or piezo electrical) and electrical components. The apparatus is illustrated in diagrammatical form for simplicity and clarity.

Figure 3:
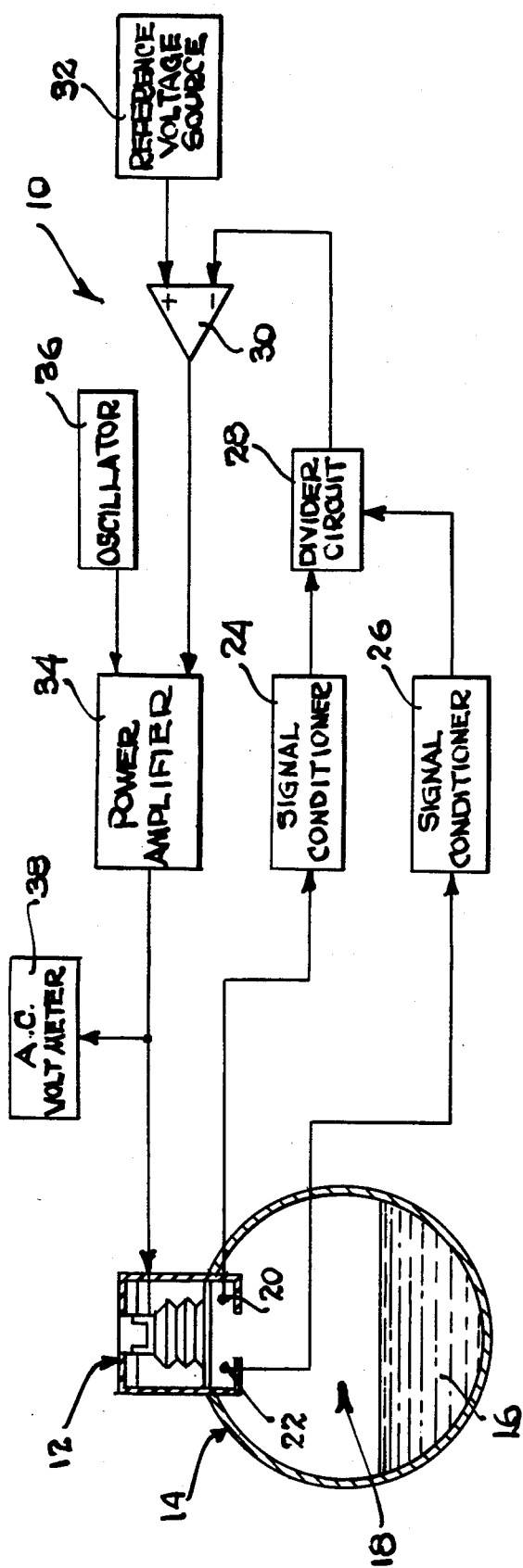
FIG. 3 is a diagrammatical illustration of one embodiment of the system of the present invention showing a schematic of the electrical circuitry adapted for volume measurements.

The sound source 12 is preferably an electrodynamic driver. However, the driver 12 could also alternatively be a piezo electrical driver or other suitable acoustical source. The driver 12 emits sound into an enclosed space or chamber 14. The chamber is shown in FIG. 3 as containing a liquid or other incompressible material 16 therein. Above the liquid 16 is a gas or other compressible fluid 18 into which the sound from the driver 12 is directed.

A pressure transducer 20 receives the sound ($\Delta P$) produced by the driver in chamber 14. The transducer 20 is preferably an piezoelectric sensor, although it could also be an electrodynamic or semiconductor strain gauge sensor or optoelectrical or capacitive sensor or any suitable sensor capable of accurately measuring the sound.

A pressure transducer 22 measures the static pressure in the chamber 14. The transducer 22 is preferably a strain gauge sensor, but it could also be any DC current responsive sensor such as, for example, optoelectrical or semiconductor or capacitive sensor.

Signal conditioner 24 receives the output from the transducer 20 and preferably amplifies, filters and converts the output to DC voltage proportional to the acoustic signal ($\Delta P$). Similarly, signal conditioner 26 receives the output from the transducer 22 and preferably amplifies, filters and converts the output to DC voltage proportional to the static pressure (P).

The outputs from signal conditioners 24 and 26 are fed into a divider circuit 28 which produces an output signal proportional to the ratio of the output from conditioner 24 to the output from conditioner 26. Such divider circuits known to those skilled in the art and commonly available in many forms to accomplish this purpose.

The output from circuit 28 is fed to a differential amplifier 30. The amplifier 30 also receives a reference voltage from a suitable reference voltage source 32. The source is preferably capable of varying the reference voltage within certain desired parameters. The amplifier 30 is preferably a high gain type in order to obtain high loop gain for the outputs from source 32 and circuit 28. As a result, the amplifier 30 produces an output which is the difference between the outputs from the circuit 28 and source 32.

A gain controlled power amplifier 34 receives the output from a suitable constant amplitude sine wave oscillator 36. The oscillator 36 generates a preferably preselected low frequency, stable constant amplitude sine wave signal. The amplifier 34 has a variable gain controlled by the output voltage from amplifier 30. The output of the amplifier 34 feeds into the driver 12 controlling its amplitude of oscillation. The amplitude of oscillation of driver 12 in turn controls the acoustical signal which is also the differential pressure ($\Delta P$) in chamber 14.

An AC voltmeter 38 monitors the voltage signal output from the amplifier 34. Since the ratio ($\Delta P/P$) is maintained constant by the system 10, the signal output from amplifier 34 is equivalent to ($\Delta V$) and in turn to gas volume 18. Thus, a voltmeter 38 readout can yield a desired unknown quantity in the system such as volume 18 i.e., (V).

Essentially, the system incorporates a feedback control (which preferably includes conditioner 24, conditioner 26, divider 28, differential amplifier 30, source 32, amplifier 34 and oscillator 36, but other suitable feedback systems could also be used) which controls the acoustical driver or sound source 12 so that it results in the dynamic pressure divided by the static pressure being equal to a constant. Basicly, the system 10 works so that the output from the divider 28 (and therefore P/P) is maintained equal to the reference voltage to a high degree of precision. The high degree of precision is due to the high loop gain of the entire system 10. For example, if the loop gain is 10,000, the output from divider 28 is approximately 0.9999 the reference signal. The gain is sufficiently high to produce an output at the power amplifier 34 which output has a selected amplitude range to control the amplitude of oscillation of the sound source 12. It is thus aparent that a great stability and accuracy can be obtained employing a very high loop gain system. FIG. 3 illustrates a closed loop system to maintain $\Delta P/P$ constant such that volume V is directly proportional to $\Delta V$.

Another important use of the system is to obtain a measurement of an unknown quantity, the ratio of specific heats when the volume of the gas in the chamber 14 is known. The ratio of specific heat values approach unity at very low frequency measurements. Thus, a comparison of the measurements of the differential volume at both high and low frequencies can yield a measurement of the specific heat ratio. This can be expressed mathematically by the following equations:

At low frequency measurements:

$$\Delta P/P = \Delta V/V$$

$$\Delta P/P = \text{constant} = A$$

Since $$\gamma = 1$$

and $$\Delta V_l = VA$$

where
$\gamma$=specific heat ratio and
$\Delta V_l$=differential volume at low frequencies (isothermal process)

At high frequency measurements:

$$\Delta V_h = (1/\gamma)VA = \text{differential volume at high frequencies (adiabetic process)}$$

Therefore, combining both measurements yields the following equation:

$$\gamma = \Delta V_l/\Delta V_h$$

Figure 4:
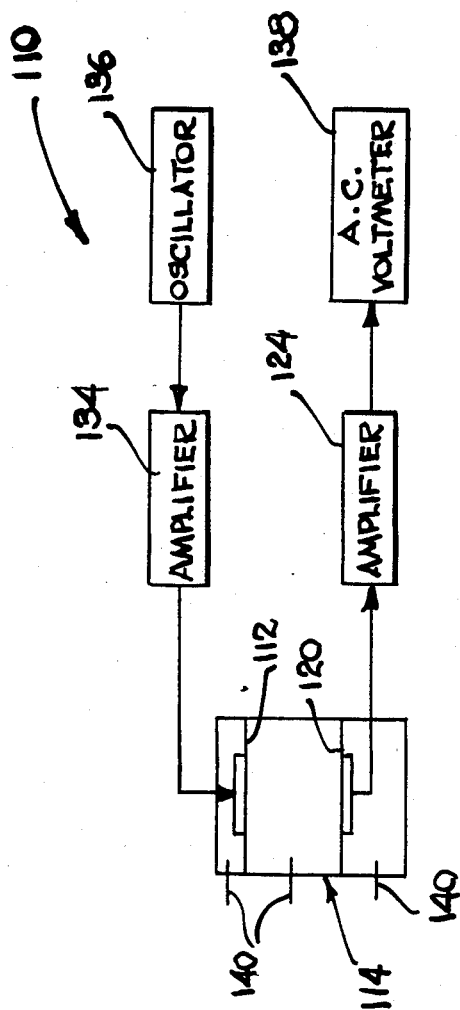
FIG. 4 is a diagrammatical illustration of another embodiment of the system of the present invention showing a schematic of the electrical circuitry adapted for pressure measurements.

FIG. 4 illustrates an open loop sytem with $\Delta V/V$ constant such that the static pressure P is directly proportional to dynamic pressure $\Delta P$.

In this embodiment 110 of the invention, the differential volume in the chamber 114 is maintained constant while the differential pressure in the chamber 114 is measured by the detector 120. The output from the detector 120 (which may, for example, be an electrodynamic or piezoelectrical type) is fed into an amplifier 124 which in turn feeds a signal into an AC voltmeter 138. The readout of the voltmeter 138 represents the static pressure (P). A constant amplitude sine wave oscillator 136 provides a sinusoidal voltage signal which is fed to a fixed gain amplifier 134. The output from amplifier 134 drives an acoustical driver 112 at a preselected frequency. Thus, the driver 112 (which may, for example, be an electrodynamic or piezoelectric type) (is driven at an amplitude set by the output voltage of the amplifier 134. Consequently, the acoustical signal (P) is proportional to the static pressure (P) since differential volume (V), gas volume (V) and specific heat ratio are constant. This embodiment 110 utilizes fewer components than embodiment 10. In addition, it may be desirable to provide leakage of static pressure from the chamber 114 to the outside environment. In such an instance, leakage paths 140 may be provided to allow communication of gas between the chamber 114 and the outside environment to equalize the static pressure inside and outside the chamber 114. By use of the leakage paths 140, measurements of the static pressure can be made by measurement of the static pressure in the chamber 114, and vice-versa.

It can also readily be seen that compliance (for example, of a lung) can be measured using the applications of the principles described hereinabove. The compliance of a lung containing a volume of air (10 liters) is:

$$\Delta V/\Delta P = V_o/P_o\gamma$$

where $\gamma = 1.41$; $V_o = 10$ liters; and $P_o = 14.7$ psi.

Figure 2:
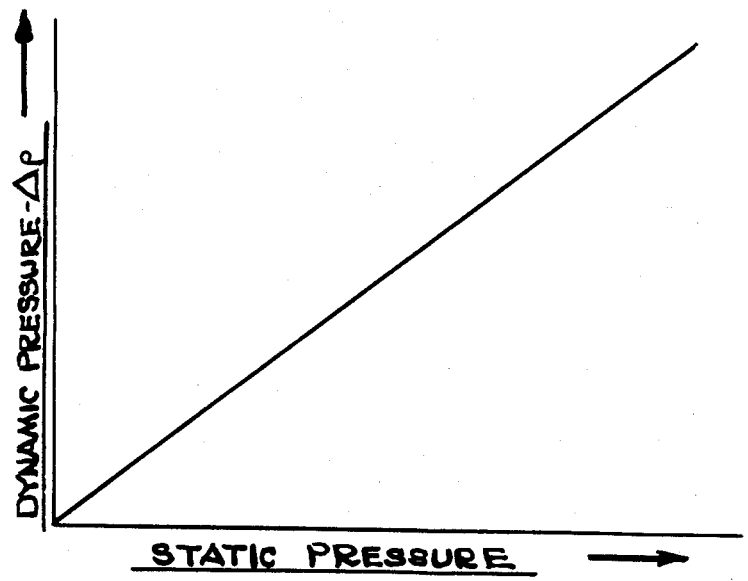
FIG. 2 is a graphical illustration of the response of the system of the present invention where $\Delta V/V$ is constant.

The graphical illustration of FIG. 1 is a graph of gas dynamic volume $\Delta V$ or AC voltmeter readout $E_o$ as a function of gas volume V, based on $\Delta P/P$ being constant. FIG. 2 is a graph of dynamic pressure $\Delta P$ as a function of static pressure P based on $\Delta V/V$ being constant.

It is to be understood that the above described embodiments are merely illustrative of some of the many specific embodiments which represent applications of the principles of the present invention. Clearly, numerous and varied other arrangements may readily be devised by those skilled in the art, without departing from the spirit and scope of the invention.

What is claimed is:

1. An apparatus for measuring the volume of a gas in an enclosed space, comprising:
   means for producing a dynamic pressure in the gas;
   means for measuring the dynamic pressure;
   means for measuring static pressure of the gas;
   feedback control means for feeding measurements from said means for measuring dynamic pressure and said means for measuring static pressure to control said means for producing so that a ratio of the dynamic pressure to the static pressure is a selected constant.

2. The apparatus of claim 1 wherein said means for measuring dynamic pressure has an electrical output.

3. The apparatus of claim 2 wherein said means for measuring static pressure has an electrical output.

4. The apparatus of claim 3 further including a means for converting the measurement from said means for measuring dynamic pressure to a dc output.

5. The apparatus of claim 4 further including a means for receiving the output from said means for measuring dynamic pressure and said means for measuring static pressure and producing an output proportional to a ratio of the output from said means for measuring dynamic pressure and said means for measuring static pressure.

6. The apparatus of claim 5 further including:
   a differential amplifier;
   means for supplying a reference signal to said differential amplifier, said differential amplifier having an output proportional to the difference between the reference signal and the output from said means for receiving.

7. The apparatus of claim 6 further including:
   a power amplifier, and
   an oscillator, said oscillator having an output feeding into said power amplifier to produce a signal output from said power amplifier having a selected frequency, said power amplifier receiving the output from said differential amplifier, said power amplifier having a selected gain, the gain being sufficiently high to produce an output having a selected range of amplitudes to control the amplitude of oscillation of the means for producing a dynamic pressure so that the output from said means for receiving approaches but does not equal the reference signal.

8. The apparatus of claim 1 wherein said feedback control means includes a closed loop servo system having a very high gain within the range of 1,000 to 1,000,000 so that the ratio of the dynamic pressure to the static pressure is a selected constant.

9. An apparatus for measuring the specific heat ratio of a gas in an enclosed space, comprising:
   means for producing a dynamic pressure in the gas;
   means for measuring the dynamic pressure;
   means for measuring the static pressure of the gas;
   feedback control means for feeding measurements from said means for measuring dynamic pressure and and said means for measuring static pressure to control said means for producing so that a ratio of the dynamic pressure to the static pressure is a selected constant in order to obtain a measurement of the specific heat ratio in accordance with the formula:

$$\Delta P/P = \gamma \Delta V/V = A \text{ (a constant)}$$

$\gamma$ approaches 1.0 at very low frequency measurements (isothermal process)

$$\Delta V_l = (A)(V) \text{ at very low frequency measurements}$$

$$\Delta V_h = (1/\gamma)(V)(A) \text{ at higher (adiabetic) frequency measurements}$$
   $$\gamma = \Delta V_l/\Delta V_h$$

where
   $\Delta V_l$ = dynamic volume at low frequency measurement
   $\Delta V_h$ = dynamic volume at high frequency measurement.

10. An apparatus for measuring the volume of a gas within an enclosed space, comprising:
   means for emitting sound in the gas;
   means for measuring the dynamic pressure change of the gas induced by the means for emitting sound;
   means for measuring the static pressure change of the gas;
   a dynamic pressure signal conditioner for converting output from said means for measuring the dynamic pressure into a dc current output;
   a divider for receiving the output from said means for measuring the dynamic pressure and the output from said means for measuring the static pressure and producing a dc output proportional to the ratio of the output of said means for measuring the dynamic pressure to the output of said means for measuring the static pressure;
   means for applying a reference signal;

a differential amplifier, said amplifier receiving the output from said divider and the reference signal, said amplifier amplifying the difference between said reference signal and the output from said divider;

an oscillator having a selected sinusoidal output;

a power amplifier, said power amplifier receiving the sinusoidal output and the output from said divider, said power amplifier amplifying the sinusoidal signal by an amount proportional to the output from the differential amplifier, the output from said power amplifier driving said means for emitting sound, the output from said power amplifier increasing or decreasing the amplitude of oscillation of the means for emitting proportional to the output from the differential amplifier such that the oscillation of the means for emitting is altered to result in change in the dynamic pressure to minimize the difference between the reference signal and the divider output;

means for measuring the voltage of the output from said power amplifier.

11. The apparatus of claim 10 further including a static pressure signal conditioner receiving the output from said means for measuring the static pressure, said static pressure conditioner amplifying the output from said means for measuring and filtering the output from said means for measuring the static pressure to remove undesired signals therefrom.

12. The apparatus of claim 10 wherein said dynamic signal conditioner amplifies the output from said means for measuring the dynamic pressure and filters the output from said means for measuring the dynamic pressure to remove undesired signals therefrom.

* * * * *